United States Patent [19]

Dickstein et al.

[11] Patent Number: 4,875,124

[45] Date of Patent: Oct. 17, 1989

[54] THIN FILM MAGNETIC HEADS WITH THERMALLY CROSSLINKED INSULATION

[75] Inventors: Heidi L. Dickstein, Morgan Hill; Hiroyuki Hiraoka, Saratoga; James H. Lee, San Jose, all of Calif.

[73] Assignee: International Business Machines Corporation, Armonk, N.Y.

[21] Appl. No.: 182,535

[22] Filed: Apr. 18, 1988

Related U.S. Application Data

[63] Continuation-in-part of Ser. No. 141,738, Jan. 11, 1988, abandoned.

[51] Int. Cl.$^4$ .............................................. G11B 5/16
[52] U.S. Cl. ................................................... 360/126
[58] Field of Search ................................ 360/126, 127

[56] References Cited

U.S. PATENT DOCUMENTS

| | | | |
|---|---|---|---|
| 4,219,854 | 8/1980 | Church et al. | 360/123 |
| 4,516,180 | 5/1985 | Narishige et al. | 360/126 |
| 4,596,739 | 6/1986 | Piltingsrud et al. | 360/135 X |
| 4,652,954 | 3/1987 | Church | 360/120 |

OTHER PUBLICATIONS

Cortellino et al., "Photoresist for Use in Silicon Nitride Etching Baths", IBM Technical Disclosure Bulletin, vol. 14, No. 8, Jan. 1972.

W. E. Feely, "Microplastic Structures", SPIE, vol. 631, Advances in Resist Technology and Processing III, (1986).

*Primary Examiner*—John H. Wolff
*Attorney, Agent, or Firm*—Joseph G. Walsh

[57] ABSTRACT

A thin film magnetic head is provided in which the electrical insulation surrounding the conductive coil comprises a photosensitive resin which has been crosslinked by a thermally activated crosslinking agent or promotor. The addition of the thermally activated crosslinking agent or promotor greatly reduces both the cure temperature and cure time and results in enhanced dimensional stability without any deleterious effects.

6 Claims, 1 Drawing Sheet

THIN FILM MAGNETIC HEADS WITH THERMALLY CROSSLINKED INSULATION

The present application is a continuation-in-part of copending application Ser. No. 141,738 now abandoned.

DESCRIPTION

1. Technical Field

The present invention is concerned with thin film magnetic heads and, in particular, with nonmagnetic insulating material to be used in making such heads.

2. Background Art

Thin film magnetic heads are well known in the prior art. They are shown, for instance, in U.S. Pat. Nos. 4,219,854, 4,516,180 and 4,652,954.

The use of thermally activated crosslinking agents or promotors in connection with polymers has been known previously. A photo resist composition using a very low percentage of a thermally activated crosslinking agent is shown in IBM's *Technical Disclosure Bulletin*, Vol. 14, No. 8, page 2309, January 1972. W. E. Feely, *Proceedings of SPIE*, Vol. 631, 48, 1986, shows crosslinking of a photo resist.

As far as we are aware, none of the prior art concerned with thin film magnetic head assemblies deals with the use of a photo resist containing a thermally activated crosslinking agent. For instance, none of the patents referred to above makes any mention of a thermally activated crosslinked photo resist. In like manner, the IBM *Technical Disclosure Bulletin* and the SPIE publication referred to above are totally silent in regard to thin film magnetic heads.

DISCLOSURE OF THE INVENTION

The present invention is concerned with thin film magnetic heads in which the electrical insulation surrounding the conductive coil is formed from a photosensitive resin which has been crosslinked by a thermally activated crosslinking agent.

BRIEF DESCRIPTION OF THE DRAWING

A thin film magnetic head is shown in the accompanying drawing.

Figure 1:
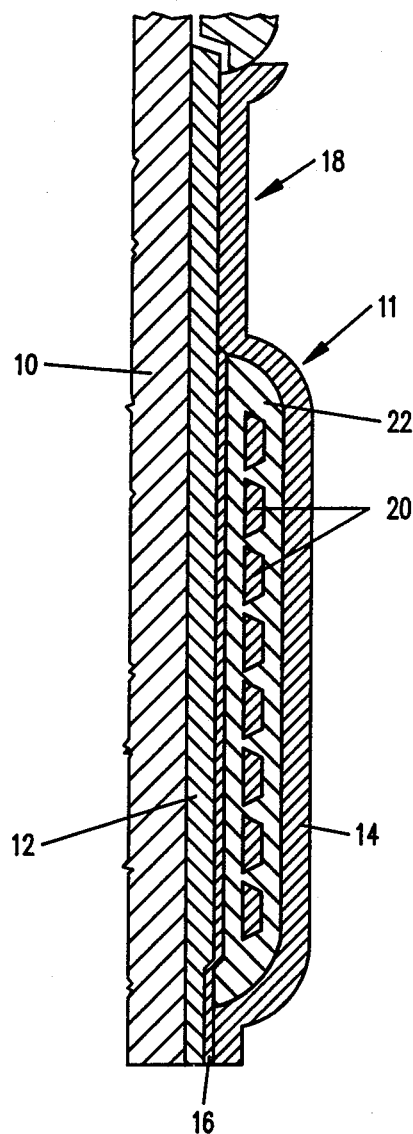
FIG. 1 is a sectional view of a thin film magnetic head assembly including an electrically conducting coil surrounded by an insulator which is a photosensitive resin crosslinked by a thermally activated crosslinking agent.

With reference to the drawing, a thin film head assembly 11 comprises a nonmagnetic ceramic support on which are deposited magnetic pole piece layers 12 and 14. A nonmagnetic insulating material 22 is deposited between the pole piece layers 12 and 14. 16 is a transducing gap, which interacts in transducing relation with a magnetic medium, preferably in an air bearing relationship, as is well known in the art. For this purpose, the support 10 is formed as a slider with an air bearing surface (ABS) that flies closely adjacent to the record medium, which may be a rotating magnetic disk, during operation of a disk file.

The thin film head structure has a back gap portion 18 formed by the closure of the pole pieces 12 and 14. The back gap closure 18 is spaced from the transducing gap, with a coil structure 20 interposed between the back gap and the transducing gap.

The continuous coil 20 is located between and coupled magnetically to the separated pole piece layers 12 and 14. The coil 20 and the pole pieces 12 and 14 are separated by the insulator 22, which embodies the portions of the coil between the pole pieces. The center area of the coil provides an electrical contact (now shown) and similarly, the outermost termination of the coil has an enlarged area for an electrical contact (not shown). The contacts are connected to external wiring and head circuitry (not shown) for processing write and read data signals.

In a typical process currently used to manufacture thin film heads, the insulation is crosslinked by the use of high temperatures and extremely long cure cycles. These temperatures are as high as 260 degrees C. and as long as 20 hours. Furthermore, the radical reaction is extremely sluggish and incomplete with the finished product lacking the desired dimensional stability. The present invention provides a long sought solution to these very serious problems, reducing the required temperature by 80 degrees C., and the required time by 15 hours. The resulting product has greatly improved dimensional stability.

According to the present invention, the nonmagnetic insulating material of the thin film magnetic head assembly comprises a photosensitive resin which contains a thermally activated crosslinking agent. By the use of such materials, the cure time is greatly reduced, the cure temperature is greatly reduced and there is produced a more stable insulation layer.

It should be emphasized that still an additional advantage of the present invention is that the thermally activated crosslinking does not interfere with either the insulating properties of the final product or with the photolithography. This point is particularly important because prior to the present invention, other efforts to achieve the present result failed in these respects.

It should also be emphasized that because the present invention makes possible the use of lower temperatures than the prior art, the invention opens up many previously impossible manufacturing processes, involving the use of materials the use of which was not previously possible because they were too sensitive to temperature.

A preferred resin for use in the present invention is a novolac resin, many varieties of which are known to the art. The novolac is made sensitive to radiation by the addition of a photosensitizer, many of which are known to the prior art. Photo sensitizers include, for example, 1-oxo-2-diazonaphthalene sulfonic acid derivatives. Materials of this sort are preferred for use in the present invention.

Three types of crosslinking promoters have been employed to thermally accelerate the crosslinking reaction for the insulator layers in the thin film head. The first type involves the use of a melamine crosslinking agent. Such agents are commercially available, for example, the malamine resin Cymel 303, available from the American Cyanamid Company. Another typee of thermally activated crosslinking agent available for use in the present invention is epoxy novolac resins in combination with a latent catalyst. Epoxy nonvolac resins include epoxy phenol (EPN) and epoxy cresol novolac (ECN) resins such as ECN 1273 from Ciba-Geigy. The latent catalyst is of the hindered boron trichloride family commonly used in the curing of epoxy compounds. These types of catalyst are commercially available, including DY9577 from Ciba-Geigy. Still a third type of crosslinking promoter is the bisazide type, for example 3.3'-diazido-diphenylsulfone, and 4,4'-diazido-diphenylsulfide. In general, the thermally activated crosslinking promotor is preferably present in an amount from about 10 to about 50% by weight of the novolac resin, most preferably in an amount of 20 to 40% by weight.

The following examples are given solely to illustrate preferred embodiments of the present invention, many variations of which will occur to those skilled in the art, without departing from the spirit or scope thereof.

Different routes were employed to prepare thermally crosslinkable resists, depending on the type of crosslinking agent used. The first route made use of a melamine resin. To prepare an approximate 30 wt. % of melamine of novolac resin, 2 g of hexamethoxymethylmelamine is added to 25 g of a novolac based positive photo resist such as AZ1375 from Hoechst positive photo resist. With mixing, a homogeneous solution is attained. The thermally crosslinkable photo resist is ready for use.

The second type of resist contains ECN resin. To prepare a 20 wt. % mixture of of resin to resist, 1.8 g of epoxy cresol novolac is added to 25 g of AZ1375 positive photo resist. The viscosity is reduced with the addition of 20 ml of cellosolve acetate solvent. Upon achieving a homogeneous mixture, 0.4 g of DY9577 is added. After mixing for approximately one hour, the thermally crosslinkable insulation resist is ready for use.

A resist was prepared from AZ1350J novolac resin to which 10% by weight of 4,4'-diazido-diphenylsulfide was added with thorough mixing. The resist containing the additive became hardbaked much faster than the resist without the additive.

We claim:

1. A thin film magnetic head characterized in that the electrical insulation which surrounds the conductive coil comprises a photosensitive resin which has been crosslinked by a thermally activated crosslinking agent or promotor.

2. A thin film magnetic head as claimed in claim 1 in which the photosensitive resin is a novolac resin.

3. A thin film magnetic head as claimed in claim 2 in which the thermally activated crosslinking agent or promotor comprises from about 10 to about 50% by weight of the novolac resin.

4. A thin film magnetic head as claimed in claim 1 in which the crosslinking agent is a melamine.

5. A thin film magnetic head as claimed in claim 1 in which the crosslinking agent is an epoxy cresol novolac resin containing a latent catalyst.

6. A thin film magnetic head as claimed in claim 1 in which the crosslinking promotor is of the bisazide type.

* * * * *